(12) United States Patent
Marr et al.

(10) Patent No.: US 8,476,363 B2
(45) Date of Patent: Jul. 2, 2013

(54) EXPANDING VOID FILLER AND A PROCESS OF MANUFACTURING SAME

(75) Inventors: Jason Eric Marr, Crowley, TX (US); Wenyu Yang, Flower Mound, TX (US); Brandon Curtis Kline, North Richland Hills, TX (US); Tyrone Hines, Fort Worth, TX (US); Chris Arnoldt, Fort Worth, TX (US)

(73) Assignee: Edge Adhesives, Inc., Fort Worth, TX (US)

( * ) Notice: Subject to any disclaimer, the term of this patent is extended or adjusted under 35 U.S.C. 154(b) by 15 days.

(21) Appl. No.: 12/893,913

(22) Filed: Sep. 29, 2010

(65) Prior Publication Data

US 2011/0189393 A1 Aug. 4, 2011

Related U.S. Application Data

(60) Provisional application No. 61/246,929, filed on Sep. 29, 2009.

(51) Int. Cl.
*C09J 175/08* (2006.01)
*C09J 123/00* (2006.01)
*C09J 121/00* (2006.01)

(52) U.S. Cl.
USPC ......... 524/590; 524/502; 524/507; 427/207.1

(58) Field of Classification Search
USPC ................. 427/207.1; 524/502, 507, 590
See application file for complete search history.

(56) References Cited

U.S. PATENT DOCUMENTS

| 6,420,447 | B1 * | 7/2002 | Kittel et al. | 521/174 |
| 6,967,226 | B2 * | 11/2005 | Shah | 524/590 |
| 7,067,607 | B2 * | 6/2006 | Eugene | 528/76 |

* cited by examiner

*Primary Examiner* — Satya Sastri
(74) *Attorney, Agent, or Firm* — Winstead PC

(57) ABSTRACT

An adhesive composition, a process of manufacture and a method of filling a surface having voids with a void filler are disclosed herein. Upon insertion between opposing surfaces or around an exposed surface, the void filler expands into and around the voids, filling surfaces having voids and covering irregularities of concrete structures.

6 Claims, No Drawings

EXPANDING VOID FILLER AND A PROCESS OF MANUFACTURING SAME

CROSS-REFERENCES TO RELATED APPLICATIONS

This application claims the benefit of U.S. Provisional Application 61/246,929, filed Sep. 29, 2009.

FIELD OF THE INVENTION

In the construction of various projects utilizing concrete pipe, care must be taken to find a suitable method for filling voids of concrete pipe carrying various fluids and covering irregularities in pipe surfaces.

In constructing various concrete structures, numerous methods to prevent leakage and seal concrete pipes have been used, comprising butyls, plastics, asphalt and the like. Many non curing compounds utilizing polymers, pre-polymers or butyl materials when used alone lack the cohesive strength to provide for suitable compression at either an end flange or provide the necessary swell ability to fill voids. Cured compounds lack flexibility and become brittle from repeated thermal cycling. After being used for long periods, decreases in resiliency occur with a concomitant increase in creep reducing sealing capabilities. The use of polymer compounds in any underground concrete constructions has become problematic due to toxicity of component parts, levels of volatile organics and characteristic leaching which contaminates ground water or soil are common place.

Recently water-swelling compositions have been created by adding organic substances in non-cross-linked rubber compositions to improve the ability of these rubber compositions to fill voids or seal various pipes. Presently, proposed compositions have difficulties when compounded. The ratio of the water-swelling organic substance is low, so that sufficient leakage preventing abilities cannot be achieved, and conversely when the organic compounds are too high, the dispersion of the swell-able organic substance in the compounded matrix is insufficient and the strength of the composition is substantially reduced.

Additionally, swelling organic compounds are subjected to hydrolysis, oxidative deterioration, and further decomposition. Repeated swelling tends to weaken organic, non-organic and curing polymers as wet and dry cycles are repeated, with the residual low molecular weight components tending to cause negative environmental effects.

Various new materials have been used on preformed concrete joint members in the field of civil engineering construction. Such materials have been used at junctions of concrete pipes. Many are made of soft resilient asphalt, with some having semi-hard plastic cores enclosed by soft adhesive mainly consisting of polypropylene, or foamed plastics, or some are provided with adhesive layers disposed on all or a part of the outer surfaces, with resulting poor performance due to loss in compositional void filling once the liquid leaches out of the swelling polymer.

It is noted that joint portions of preformed concrete members are often made in socket-and-plug type or male-female type. Such joint portions cause leaks, because of insufficient dimensional accuracy in concrete surfaces, voids in the surfaces of concrete pipes and improper field work at the site, or uneven sinking of the land. Many if not all gaskets or seals or transition parts presently for concrete pipes and concrete structures are positioned only as the pipes are assembled or structures are built and require accurate positioning which is difficult or impossible. Where seals, gaskets or transition parts fail over time, the replacement of the joint seal is difficult at best.

The creation of an expanding void filler has been noted to provide several benefits, which include an ability to be dimensionally adjusted in the field. In one case, expanding the void filler in an elongated profile could be fitted to any size section of a pipe. In other cases, it has been noted that the expanding void filler provides for a controlled swell that is time dependent. That is, as the weeks go by, the material can continue to expand to fill voids in pipes or fit compressively against opposing faces at a joint. Additionally it has been noted in test and development that the expanding void filler can lose water without a concomitant loss in a newly expanded configuration. In another case, the expanding void filler when used as a gasket has tacky properties that allow it to stick to vertical side walls and maintain positioning between two opposing faces at a juncture.

SUMMARY OF THE INVENTION

In general, in a first aspect, the composition has hydrophilic reactants mixed with a hydrocarbon polymer and covalently bonded polymer and a rubber containing core component mixed with filler particles along with a plasticizer and a cross-linking agent. Various aspects may include one or more of the following features, at least one hydrophilic reactant, with the hydrophilic reactants having a range of OH numbers of at least 34 to 112 and a functionality of between from at least 2.0 to no more than 3.0 and a formula weight percent range of at least 5% to no more than 21%. Various other components may be a hydrocarbon polymer and a rubber containing core component.

In general, in a second aspect, the process of manufacturing an adhesive composition comprises the following steps: A mixture of a first, second and third hydrophilic reactants, is mixed with a hydrocarbon polymer and rubber containing core component and further blended with some additional filler particles. Control of the polymerization occurs by mixing the hydrophilic reactants with the cross-linking agents and particles. Further mixing of the polymerized reactants and particles with the rubber containing core component creates an adhesive composition. Such mixing of reactants and polymerization of reactants may be controlled with a rotational arm which is interconnected to a viscosity controller and meter. The mixing device is connected to the distal end of a mixing arm positioned inside of a container which is in turn thermally connected to a heating element. The heating element heats the adhesive composition in which case an interpenetrating rubber containing core component forms such that the rubber containing core component creates interstitial spaces. The interstitial space created contains particles as well as rubber.

Controlling the physical reaction step is linked to the control of the polymerization reaction. The physical reaction may be further controlled by controlling the speed of the rotational arm. The rotational arm and the temperature can be used to control the viscosity of the hydrophilic reactants of the adhesive composition. All the hydrophilic reactants are polyethers and mixed with particles which are entrained within the interstitial spaces created as the rubber and particles interpenetrate with the rubber containing core component. The interstitial spaces exist as a function of incomplete filling of the interstitial spaces by particles and rubber. Without particles, liquids may be entrained but the presence of particles allow for further entrainment of liquids and better development of cohesive strength. The hydrocarbon polymer may be one of many amorphous polymers.

In general, in a third aspect, the method of filling voids in surfaces having voids with a void filling material is accomplished using a time dependent hybrid material that corresponds to an liquid uptake of a plurality of different entrainments up to 150% of the weight of the hybrid material.

The method of filling voids in surfaces having voids with a void filler may include one or more of the following features: a mix of butyl rubber, and a rubber containing core component mixed with hydrophilic reactants and particles creating an interpenetrating structure that may attract and entrain liquids into the void filler. The void filler expands over time to fill surfaces, surface irregularities and voids, along the tubular surface of pipe sections or as between joint spaces.

In general in a fourth aspect, the method of mixing hydrophilic reactants is accomplished utilizing a system and an apparatus with a viscosity controller and an output viscosity meter measured by the heating of the mix in an intermediate mixing operation.

The method of mixing a hydrophilic reactant with a cross-linked rubber containing core component in an apparatus may include one or more of the following features. A mixture of a covalently bonded hydrophilic reactant with a cross-linked rubber is mixed with a rotational arm with such rotational arm electrically connected to the viscosity controller. The viscosity controller is further electrically attached to a viscosity meter. The heating element is thermally connected to a container for containing the compositions, mixtures, agents and reactants with a rotational sensor electrically connected to a viscosity meter to display the viscosity measurement.

In a fifth aspect, an article of manufacture may be any of a number of various forms including a gasket or an elongated profile as applied to pipe.

A gasket consisting of a compressively flexible part and an adhesive part both of which acting together provide an article that may be fitted between two opposing faces of a transition joint of any of a number of end fittings of pipe. In an elongated profile the gasket may be fitted to any dimension of pipe and applied in the field after the pipe is joined but before the pipe is completely compressed together.

DETAILED DESCRIPTION OF EXEMPLARY EMBODIMENTS

As used herein, the hydroxyl number (OH number) is a measure of the concentration of the hydroxyl groups on a polyol. As used herein, the average functionality (i.e. the number of functional groups per polymeric chain) of the polyol can be estimated by:

$f(HO)=(OH number \times Mn)/56.100$, where Mn is the number average molecular weight, which is the total weight of all the polymer molecules in a sample, divided by the total number of polymer molecules in a sample.

The adhesive composition of the expanding void filler of the claimed invention is both hydrophobic and hydrophilic. The adhesive composition is capable of adsorbing up to 150% by weight of entrained fluids without a concomitant loss in the newly formed volume or loss in the configuration obtained during the swell, once the liquid is removed. Hydrophilic polymers attract other polar bonded liquids.

The hydrophilic and hydrophobic polymers along with the rubber containing core component and the rubber of the expanding void filler imparts a controlled swell rate to the material. The controlled swell is equal to approximately 150% by weight of the expanding void filler present. Control of the swell is metered by the ratio of the hydrophilic polymer to the hydrophobic polymer.

The ratios of the ingredients are controlled so that the reinforcing phase, which is the phase that provides cohesive strength to the expanding void filler, is in excess of the absorbent phase, the phase that controls the absorption of polar liquids or other entrained fluids, so that sufficient cohesive strength is maintained, and liquid exudation is prevented in the finished product.

In one aspect of the expanding void filler, there exists a first liquid phase/hot melt hybrid adhesive technology that is based on a blend of functionally specific materials. The adhesive form is a liquid dispersion at room temperature, and is stable as a liquid when stored at temperatures of up to approximately 120° F. The first liquid phase of the adhesive fuses and melts when the dispersion is exposed to temperatures in excess of 250° F. However, with mixing, the dispersed ingredients form a second soluble, molten "hot-melt" solution, which can be dispensed like other hot melt adhesives. Once dispensed, the molten hot melt cools to form a third solid adhesive after processing.

The hot melt may be thermally stable for long periods of time at process temperatures, and like other thermoplastic adhesives, it can be re-melted, and reused after cooling. The achievement of fiber tear adhesion is strongly dependent on mixing (since there may be more than one polymer component and sometimes at least two polymer components), and on activation temperature. Inadequate mixing will result in cohesive failure of the adhesive. Similarly, the adhesive should be molten and mixed at temperatures in excess of 250° F. to activate the chemistry; otherwise, the adhesive may cohesively fail.

The adhesive compositions of the expanding void filler are based on blends of materials. It has been discovered that a liquid phase/hot melt hybrid of expanding void fillers contain a phase, which serves as the intermediate vehicle for dispersion of other components; a reinforcing phase, which gives the adhesive the requisite cohesive strength for the end use application; and an absorbent phase, which prevents exudation of the liquid phase during hot melt processing, during application, and during end-use. The adhesive compositions also preferably include an activator, which helps to prevent exudation in the finished product; a thermal stabilizer providing stability at process temperatures.

The expanding void filler is directed to a surface-tacky controlled, time dependent, swell capable, hot melt having an adhesive composition which contains at least a first hydrophilic reactant. The first hydrophilic reactant has an OH number of 56 but can range from between the low 30's to at least as high as 112. Additionally the first hydrophilic reactant exhibits a range of functionality from at least 2.0 rising to 3.0. The first hydrophilic reactant has a formula weight percent range of 10-20%.

The adhesive composition may also have a second hydrophilic reactant. The second hydrophilic reactant has an OH number of at least 34 ranging to as high as 56, with a functionality of at least 2.0 to a high of 3.0 with a formula weight percent range of 8-18%.

The adhesive composition may also have a third hydrophilic reactant having, an OH number of at least 56 ranging up to 112, and a functionality of at least 2.0; and a formula weight percent range of 5-12%.

The adhesive composition has a thermosetting polymeric isocyanate compound of the form of a NCO % (isocyanate %) of at least 30% with a functionality of 2.0-3.0.

The first hydrophilic reactant and the second hydrophilic reactant and the third hydrophilic reactant, are coupled with a hydrophobic polymer, rubber, and a rubber containing core component, a plurality of filler particles, a plasticizer, a cross-linking agent and a covalently bonded polymer. The covalently bonded polymer is amorphous polyolefin hydrocarbon and makes up 5-30% of the weight of the total mixture.

The rubber is any of a number of natural, butyl, or halogenated rubbers. In a range of 2% to 15% by weight of total weight of the mixture is composed of butyl rubber and 15% to 40% by weight of thermoplastic copolymer which may be at least two of the hydrophilic reactants, with a formula percent weight of 5% to 20% by weight of copolymers. Generally the polymers are mixed with a hydrocarbon polymer which exists in the range of 5% to 34% in the form of a polymeric isocyanate. The hydrophilic reactants are selected from the group consisting of water-soluble polymers, water-dispersible polymers, water-soluble co-polymers and mixtures thereof. About 15 to about 50% by weight of powder based absorbers or filler particles and about 0.2 to about 2.0% by weight stabilizers may also be added to the mixture. Both thermal and liquid entrainment are combined with the hydrophilic reactants, butyl rubber and the hydrocarbon polymer to form the interpenetrating rubber containing core component.

Some other ratios that are not exact, but having ratios that fall within the above ranges are also covered within the blending operation that allows for the mixing of various hydrophilic reactants with hydrocarbon reactants without the complete activation of the chemistry occurring. The mixing apparatus results in a more uniform blend, but current processing is unable to maintain the workability of the material through viscosity standard mixing is unable to create the smooth blending and activation required.

Another phase of the combination of the hydrophilic reactants with the hydrocarbon and the butyl is the blending in a separate apparatus which covers the mix with an inert gas that prevents the entrainment of moisture during the blending phase. Control of viscosity utilizes a rotational arm connected to a viscosity meter whose rate and stability of the viscosity is directly related to heating of the mixing container with a heating element positioned and controlled by the rotational controller and the viscosity controller. The output of the viscosity controller is a meter, which identifies a temperature dependency of the viscosity to the heating by the heating element and the rotational controller of the rotational arm. This apparatus can be used in the intermediate blending and mixing operation to stabilize the manufacture of the expanding void filler material disclosed and claimed herein.

What is claimed is:

1. An adhesive composition comprising, a polyether as a first hydrophilic reactant, a polyether as a second hydrophilic reactant, a polyether as a third hydrophilic reactant, a hydrophobic polymer, a rubber containing core component, rubber, a plurality of filler particles, a plasticizer, a cross-linking agent, an amorphous polyolefin hydrocarbon and a polymeric thermosetting isocyanate.

2. The adhesive composition of claim 1, wherein said first hydrophilic reactant comprises an OH number of at least 56 and a functionality of at least 2.0 and is present in the composition at a weight percent ranging from 10-20%.

3. The adhesive composition of claim 1, wherein said second hydrophilic reactant comprises an OH number of at least 34 and a functionality of at least 3.0 and is present in the composition at a weight percent ranging from 8-18%.

4. The adhesive composition of claim 1, wherein the third hydrophilic reactant comprises an OH number of at least 112, a functionality of at least 2.0 and is present in the composition at a weight percent ranging from 5-12%.

5. The adhesive composition of claim 1, wherein said rubber containing core component comprises a natural, butyl, or halogenated rubber.

6. The adhesive composition of claim 1, wherein said polymeric thermosetting isocyanate has a NCO % of 30% and a functionality of 2.0-3.0.

* * * * *